United States Patent [19]
Ido et al.

[11] Patent Number: 5,428,453
[45] Date of Patent: Jun. 27, 1995

[54] MAGNETIC DISK RECORDER

[75] Inventors: Yasuo Ido; Satoru Gozu, both of Kanagawa; Yoshiaki Ogawara, Tokyo, all of Japan

[73] Assignee: Sony Corporation, Japan

[21] Appl. No.: 304,195

[22] Filed: Sep. 12, 1994

Related U.S. Application Data

[63] Continuation of Ser. No. 832,904, Feb. 7, 1992, abandoned.

[30] Foreign Application Priority Data

Feb. 13, 1991 [JP] Japan .................... 3-020072

[51] Int. Cl.⁶ .................. H04N 9/80; H04N 5/78; G11B 5/86; G11B 15/46
[52] U.S. Cl. .................................. 358/319; 360/15; 360/19.1; 360/73.03; 358/343
[58] Field of Search .................. 360/15, 24, 19.1, 26, 360/37.1, 35.1, 36.1, 73.03, 73.02, 27; 358/319, 148, 153, 909, 343, 321, 322, 323, 341, 338; 369/84, 85; 348/515, 500, 525, 220

[56] References Cited

U.S. PATENT DOCUMENTS

| | | | |
|---|---|---|---|
| 4,471,390 | 9/1984 | Hamann | 360/73.03 X |
| 4,792,863 | 12/1988 | Urabe | 358/909 X |
| 4,816,928 | 3/1989 | Sasaki et al. | 360/35.1 |
| 4,933,774 | 6/1990 | Ishimaru | 358/338 X |
| 5,088,077 | 2/1992 | Lemoine | 360/73.02 X |
| 5,119,242 | 6/1992 | Murray | 360/73.02 X |
| 5,166,804 | 11/1992 | Takahashi | 358/341 |
| 5,187,616 | 2/1993 | Kimura et al. | 360/35.1 X |

FOREIGN PATENT DOCUMENTS

217255 12/1984 Japan .
1107369 4/1989 Japan .

OTHER PUBLICATIONS

Patent Abstracts of Japan, vol. 12, No. 54, Feb. 18, 1988, & JP 62-200988.
Patent Abstracts of Japan, vol. 13, No. 349, Aug. 7, 1989; & JP 1-107369.
Patent Abstracts of Japan, vol. 12, No. 388, Oct. 17, 1988; & JP 63129557.
Patent Abstracts of Japan, vol. 12, No. 20, Jan. 21, 1988, & JP 62-178080.

Primary Examiner—Aristotelis Psitos
Assistant Examiner—Jennifer Pearson Wright
Attorney, Agent, or Firm—Ronald P. Kananen

[57] ABSTRACT

In a magnetic disk recorder, a displacement of recording timings of a video signal and a timebase-compressed audio signal on a master disk can be corrected on a slave disk. When an output of a master disk reproducing apparatus is a video signal, a vertical synchronizing signal from a synchronizing separating circuit is delayed by a delay time of substantially 7H (H is the horizontal period) and supplied to a phase servo circuit in a slave disk recording apparatus as a reference signal, while when the output of the master disk reproducing apparatus is the timebase-compressed audio signal, a start flag signal accompanying with the timebase-compressed audio signal is detected by a flag detecting circuit and the start flag signal thus detected is employed as a pseudo vertical synchronizing signal, which is supplied to the phase servo circuit in the slave disk recording circuit as a reference signal.

10 Claims, 3 Drawing Sheets

MAGNETIC DISK RECORDER

This application is a continuation of application Ser. No. 07/832,904 filed Feb. 7, 1992 which has been abandoned.

FIELD OF THE INVENTION

The present invention generally relates to magnetic disk recorders and, more particularly, to a magnetic disk recorder suitable for recording a recording medium of an electronic still camera, for example.

BACKGROUND OF THE INVENTION

In an electronic still camera, one field of a video signal is recorded on a floppy disk as one circular magnetic track in the form of a frequency modulated (FM) video signal. In this case, "field recording" and "frame recording" are known as the recording modes of the video signal. In the field recording, one field of a video signal is recorded on one magnetic track per recording, while in the frame recording, one frame of the video signal is recorded on two adjacent magnetic tracks by one field each per recording. One video floppy disk has a sum total track number of 50.

In such electronic still camera, an audio signal can be timebase-compressed and then recorded on a track different from the track of the video signal in the form of an FM audio signal.

In this case, as the recording mode of the audio signal, there is known a 5-second mode in which an audio signal of 5 seconds is compressed to one track (1 field=1/60 second) and then recorded, a 10-second mode in which an audio signal of 10 seconds is compressed to one track and then recorded, and a 20-second mode in which an audio signal of 20 seconds is compressed to one track and then recorded (see our U.S. Pat. No. 4,816,928).

Though not shown, a so-called PG yoke is provided at the center hub of the video floppy disk as a reference for a rotary phase.

When the aforementioned video signal and timebase-compressed audio signal are recorded, then the recording format of the video floppy disk is determined in such a fashion that a VD (vertical synchronizing signal) of a video signal is located in a range of 7H±2H from the PG position as shown in FIG. 1 and that a start flag signal Fst of a timebase-compressed audio signal shown in FIG. 2 is located at the position of 2H from the PG position.

When the content of the video floppy disk in which the video signal and the timebase-compressed audio signal are recorded is copied onto other video floppy disk, i.e., in order to perform the stable dubbing of a short period of time, the assignee of the present application has previously proposed a technique in which an FM video signal and a FM timebase-compressed audio signal reproduced on the master disk side are demodulated and then FM-modulated again on the slave disk side, thereby being recorded (see Japanese Laid-Open Patent Publication No. 1-107369).

When the content of the video floppy disk is copied or dubbed, rotary phases of the master floppy disk and the slave floppy disk must be matched with each other. Generally, the PG signal of the master video floppy disk is employed as a reference signal of the phase servo carried out by a recording apparatus on the slave floppy disk side.

However, when the content of the video floppy disk is copied on the basis of the PG signal of the master video floppy disk, a signal is recorded on the same position as that of the slave video floppy disk.

Accordingly, if the recorded position of the video signal on the master video floppy disk is not conforming to the standard (see FIG. 1) of the aforementioned recording format, then the recording position of the video signal on the slave video floppy disk also is not conforming to the standard.

In order to solve the above-mentioned problem, the assignee of the present application has previously proposed a magnetic disk recorder (see Japanese Patent Application No. 2-203062). According to this previously-proposed apparatus, when a video signal on a first magnetic disk is reproduced by a reproducing means, a vertical synchronizing signal obtained from a reproduced video signal is used as a reference signal for the phase servo of a recording means, while when an audio signal is reproduced by the reproducing means, a panel signal obtained in response to a rotation of the first magnetic disk is used as a reference signal for the phase servo of the second magnetic disk in the recording means. Thus, when the recording timing of the video signal on the first magnetic disk is out of the standard range, the signal can be recorded again (dubbed) on the second magnetic disk with a proper recording timing.

The previously-proposed magnetic disk recorder will be described with reference to FIG. 3.

Referring to FIG. 3, a master disk reproducing apparatus 10 is provided with a motor 11 for rotating a master disk Dm, a PG coil 12 for obtaining a PG signal from the master disk Dm and a phase servo circuit 13 for controlling the rotation of the motor 11 on the basis of the PG signal. The phase servo circuit 13 is supplied with an external vertical synchronizing signal VDex as a reference signal.

A video signal and a timebase-compressed audio signal recorded on the master disk Dm are reproduced by a magnetic head 14 and supplied through an amplifier 15 to an FM demodulator 16.

A slave disk recording apparatus 20 is provided with a motor 21 for rotating a slave disk Ds, a PG coil 22 for obtaining a PG signal from the slave disk Ds and a phase servo circuit 23 for servo-controlling the rotation of the motor 21 on the basis of the PG signal, similarly to the master disk reproducing apparatus 10.

An output of an FM modulator 26 is supplied through an amplifier 25 to a recording head 24 of the slave disk recording apparatus 20, and the FM modulator 26 is supplied with the output of the FM demodulator 16 of the master disk reproducing apparatus 10, i.e., a video signal Y and a timebase-compressed audio signal Atc.

A reference signal control circuit 30 includes a synchronizing separating circuit 31 and a horizontal synchronizing signal detecting circuit 32. The output of the FM demodulator 16 in the master disk reproducing apparatus 10 is supplied to the synchronizing separating circuit 31 which detects a horizontal synchronizing signal from the output of the FM demodulator 16, thereby determining on the basis of the detected result of the horizontal synchronizing signal whether a reproduced signal is the video signal or the timebase-compressed audio signal.

When the reproduced signal is the video signal, a change-over switch S1 is connected in the opposite side (V to A in FIG. 3), whereby a vertical synchronizing signal VD separated by the synchronizing separating circuit 31 is supplied through a semifixed delay circuit 33 to the phase servo circuit 23 of the slave disk recording apparatus 20. A central value of the delay time of the delay circuit 33 is selected to be 7H (H is the horizontal period).

Therefore, the rotary phase of the slave disk Ds is servo-controlled so that a detection timing point of the vertical synchronizing signal VD from the master disk Dm is delayed from a detection timing point of the PG signal from the slave disk Ds by substantially 7H. Thus, even when the recording position (timing) of the video signal on the master disk Dm is displaced from the aforementioned standard range (7H±2H), the signal can be recorded again (i.e., dubbed) on the slave disk Ds at a proper recording timing.

When the reproduced signal is the timebase-compressed audio signal, the change-over switch S1 is connected in the illustrated state (A), whereby the PG signal of the master disk reproducing apparatus 10 is supplied through a 7H delay circuit 34 and a shaping circuit 35 to the phase servo circuit 23 of the slave disk recording apparatus 20 as the pseudo vertical synchronizing signal.

Therefore, the rotary phase of the slave disk Ds is servo-controlled such that the detection timing point of the PG signal from the master disk Dm is delayed from the detection timing point of the PG signal from the slave disk Ds by the delay time of 7H, whereby jitter components of the master disk reproducing apparatus 10 and the slave disk recording apparatus 20 are removed and the timebase-compressed audio signal is dubbed (i.e., recorded again) on the slave disk Ds on the basis of the external vertical synchronizing signal VDex provided as the timing reference signal.

In accordance with the above-mentioned previously-proposed magnetic disk recorder, however, when the recording timing of the timebase-compressed audio signal on the master disk Dm is displaced from the standard range, such displacement of timing cannot be corrected into the standard range.

OBJECTS AND SUMMARY OF THE INVENTION

Therefore, it is an object of the present invention to provide an improved magnetic disk recorder in which the aforesaid shortcomings and disadvantages can be eliminated.

It is another object of the present invention to provide a magnetic disk recorder in which a displacement of recording timings of a video signal and a timebase-compressed audio signal on a master disk can be corrected within a standard range on a slave disk.

According to an aspect of the present invention, a magnetic disk recorder in which either of video and audio signals recorded on a recording track of a master disk is reproduced and then recorded again on a recording track of a slave disk comprises of a synchronizing signal separating circuit for separating a synchronizing signal included in a video signal from a signal reproduced by the master disk, a signal identifying circuit for determining the reproduced signal as a video signal when the synchronizing signal is separated by the synchronizing signal separating circuit and determining the reproduced signal as an audio signal when the synchronizing signal is not separated by the synchronizing signal separating circuit, a pseudo synchronizing signal forming circuit for forming a pseudo synchronizing signal on the basis of a flag signal accompanying with a reproduced audio signal, a selecting circuit for selecting the synchronizing signal from the synchronizing signal separating circuit when a determined result by the signal identifying circuit is the video signal and selecting the pseudo synchronizing signal delivered from the pseudo synchronizing signal forming circuit when the determined result is the audio signal, and a servo circuit for servo-controlling a rotary phase of the slave disk on the basis of a signal obtained from the selecting circuit.

According to the above-mentioned arrangement, even when recording timings of the video signal and timebase-compressed audio signal on the master disk are displaced from, such displacement can be corrected into the standard range on the slave disk.

The preceding and other objects, features, and advantages of the present invention will become apparent from the following detailed description of an illustrative embodiment thereof to be read in conjunction with the accompanying drawing, in which like reference numerals are used to identify the same or similar parts.

DETAILED DESCRIPTION OF PREFERRED EMBODIMENT

Figure 3:
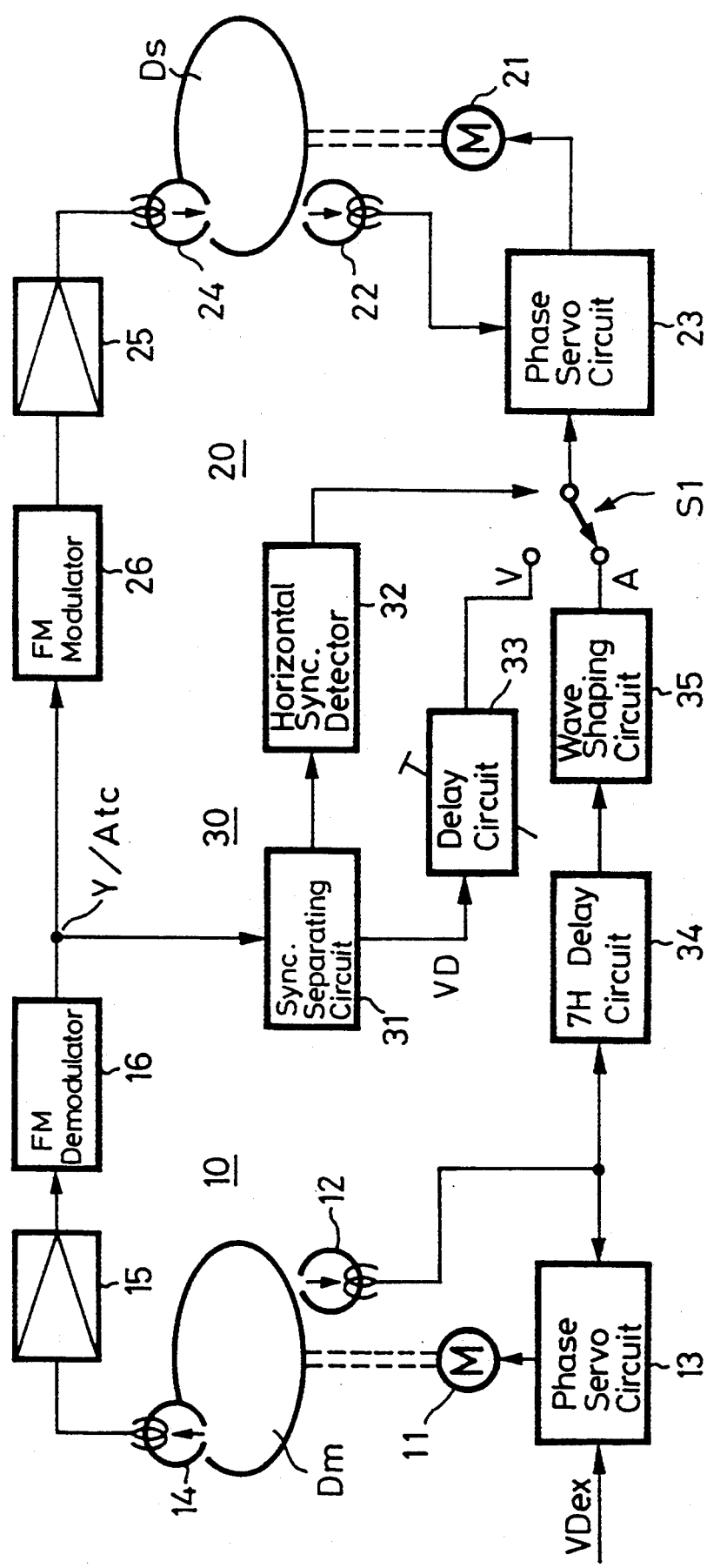
FIG. 3 is a block diagram showing an arrangement of an example of a previously-proposed magnetic disk recorder.
Figure 4:
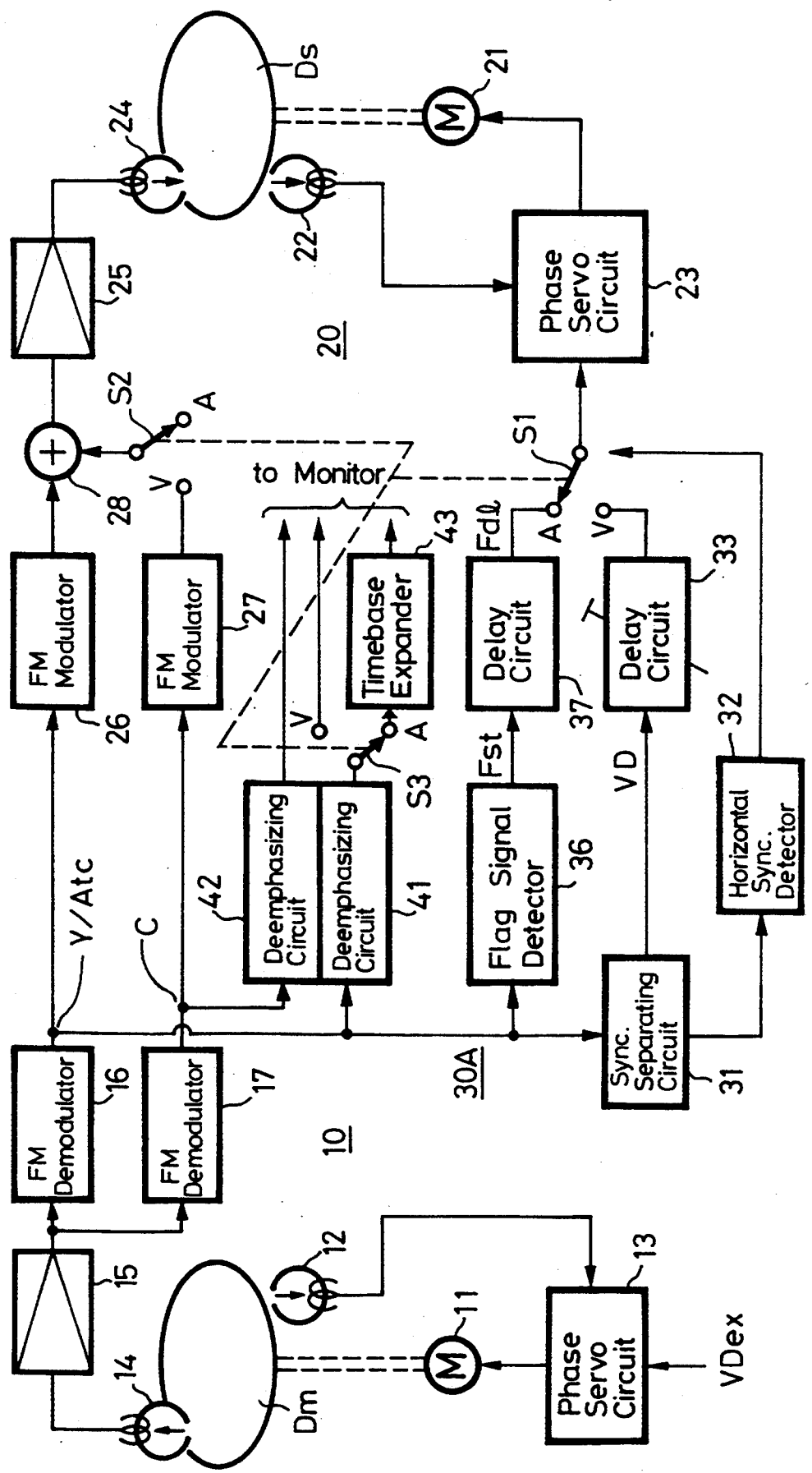
FIG. 4 is a block diagram showing an arrangement of an embodiment of a magnetic disk recorder according to the present invention.

A magnetic disk recorder according an embodiment of the present invention will be described with reference to FIG. 4. FIG. 4 shows an arrangement of the embodiment according to the present invention. In FIG. 4, like parts corresponding to those of FIG. 3 are marked with the same references and therefore need not be described in detail.

Referring to FIG. 4, the master disk reproducing apparatus 10 and the slave disk recording apparatus 20 are additionally provided with a demodulating circuit 17 and a modulating circuit 27 for a chroma signal system, respectively. These circuits 17 and 27 are not shown in FIG. 3. An output of the modulator 27 is supplied through a change-over switch S2 to an adder 28, in which it is added to an output of the modulator 26.

A reference signal control circuit 30A includes a flag detecting circuit 36 and a delay circuit 37 and is not connected to the phase servo circuit 13 of the master disk reproducing apparatus 10 in this embodiment.

The demodulated output of the demodulator 16 in the master disk reproducing apparatus 10 is supplied to the flag detecting circuit 36 and a detected output from the flag detecting circuit 36 is supplied through the delay circuit 37 and the change-over switch S1 to the phase servo circuit 23 of the slave disk recording apparatus 20. Incidentally, a delay time of the delay circuit 37 is set to a proper very small value Δt.

Demodulated outputs of the two demodulating circuits 16 and 17 in the master disk reproducing apparatus 10 are respectively supplied to a pair of deemphasizing circuits 41 and 42, and an output of one deemphasizing circuit 41 is supplied through a change-over switch S3 to a timebase expanding circuit 43. The change-over switch S3 is controlled by an output of a horizontal synchronizing detecting circuit 32 of the reference signal control circuit 30A together with the change-over switch S2 in the slave disk recording apparatus 20.

A luminance signal Y and a chroma signal C from the two deemphasizing circuits 41 and 42 are supplied to a video monitor (not shown) and an audio signal from the timebase expanding circuit 43 is supplied to a monitor speaker (not shown).

The rest of the elements in this embodiment is substantially the same as that of the example shown in FIG. 3.

Operation of the embodiment of the present invention will be described below.

When the reproduced signal is identified as the video signal by the horizontal synchronizing detecting circuit 32 in the reference signal control circuit 30A, the change-over switch S1 is connected in the opposite side, whereby the vertical synchronizing signal VD separated by the synchronizing separating circuit 31 is supplied through the semifixed delay circuit 33 to the phase servo circuit 32 of the slave disk recording apparatus 20.

Therefore, the rotary phase of the slave disk Ds is servo-controlled such that the detection timing of the vertical synchronizing signal VD from the master disk Dm is delayed from the detection timing of the PG signal from the slave disk Ds by the delay time of substantially 7H. Thus, even when the recording position (timing) of the video signal on the master disk Dm is displaced from the aforementioned standard range (7H±2H), the signal can be dubbed (recorded again) on the slave disk Ds at a proper timing.

Figure 1:
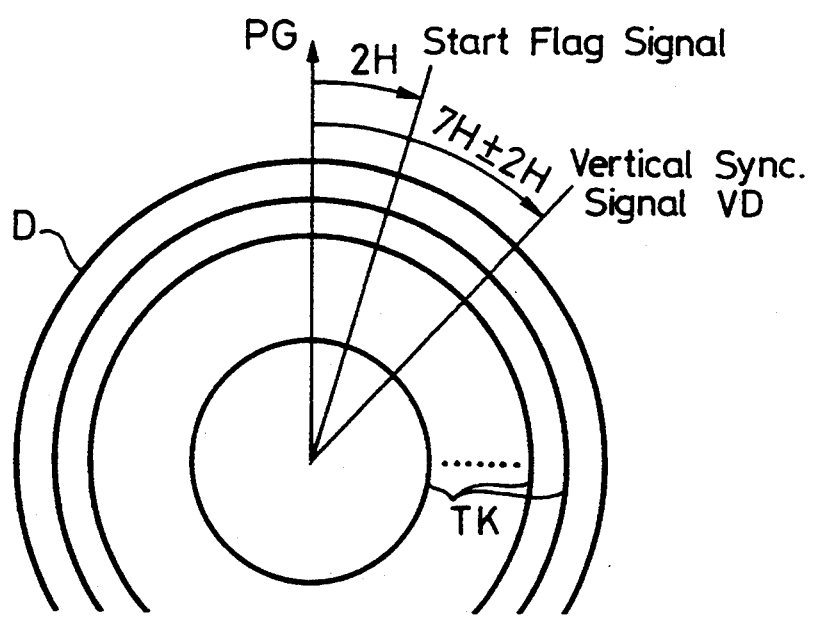
FIG. 1 is a schematic plan view used to explain a recording format of a magnetic disk.
Figure 2:
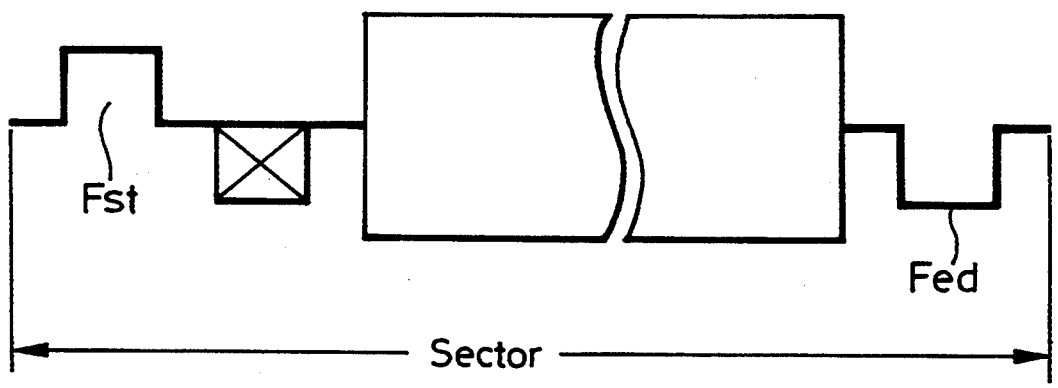
FIG. 2 is a waveform diagram used to explain a recording format of an audio signal.

Further, when the reproduced signal is the timebase-compressed audio signal, the switch S1 is connected to the illustrated state, whereby a start flag signal Fst (see FIG. 2) detected by the flag detecting circuit 36 is supplied through the delay circuit 37 to the slave disk side phase servo circuit 23 as the pseudo vertical synchronizing signal.

Therefore, the rotary phase of the slave disk Ds is servo-controlled such that the detection timing of the start flag signal Fst of the master disk Dm is delayed from the detection timing of the PG signal from the slave disk Ds by the proper very small time Δt, whereby the timebase-compressed audio signal is dubbed (recorded again) on the slave disk Ds on the basis of the start flag signal Fst reproduced from the master disk Dm.

Accordingly, even when the recording timing of the timebase-compressed audio signal reproduced from the master disk Dm is displaced from the aforementioned standard value (i.e., 2H from the PG signal to the start flag signal Fst), the displaced recording timing can be corrected to the correct timing based on the standard value and the signal can be dubbed on the slave disk Ds.

As described above in detail, according to the present invention, when the output of the master disk reproducing apparatus is the video signal, the vertical synchronizing signal obtained from the synchronizing separating circuit is delayed by the predetermined delay time and employed as the reference signal for the phase servo circuit in the slave disk recording apparatus, while when the output of the master disk reproducing apparatus is the timebase-compressed audio signal, the start flag signal accompanying with the timebase-compressed audio signal is detected by the flag detecting circuit and the start flag signal thus detected is employed as the pseudo vertical synchronizing signal and the pseudo vertical synchronizing signal is supplied to the phase servo circuit in the slave disk recording apparatus as the reference signal. Therefore, it is possible to obtain the magnetic disk recorder in which the displacement of the recording timings of the video signal and the timebase-compressed audio signal on the master disk can be corrected on the slave disk.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined on the appended claims.

What is claimed is:

1. A magnetic disk recorder in which either of video and audio signals recorded on a recording track of a master disk is reproduced and the reproduced video or audio signal is recorded again on a recording track of a slave disk, comprising:

(a) synchronizing signal separating means for separating a synchronizing signal included in a video signal from a signal reproduced by said master disk;

(b) signal identifying means for determining the reproduced signal as a video signal when said synchronizing signal is separated by said synchronizing signal separating means and determining the reproduced signal as an audio signal when said synchronizing signal is not separated by said synchronizing signal separating means;

(c) pseudo synchronizing signal forming means for forming a pseudo synchronizing signal on the basis of a flag signal accompanying a reproduced audio signal;

(d) selecting means for selecting said synchronizing signal from said synchronizing signal separating means when a determined result by said signal identifying means is the video signal and selecting said pseudo synchronizing signal delivered from said pseudo synchronizing signal forming means when the determined result is the audio signal; and (e) servo means for servo-controlling a rotary phase of said slave disk on the basis of a signal obtained from said selecting means.

2. A magnetic disk recorder according to claim 1, wherein said servo means controls a rotation of said slave disk such that said synchronizing signal or pseudo synchronizing signal reproduced from said master disk is delayed from a reference position of said slave disk by a predetermined time.

3. A magnetic disk recorder according to claim 2, wherein a timebase-compressed audio signal is recorded on and reproduced from said recording track as said audio signal.

4. A magnetic disk recorder according to claim 3, wherein said signal identifying means determines the reproduced signal from said master disk as the video signal when a horizontal synchronizing signal within said video signal is detected.

5. A magnetic disk recorder according to claim 4, wherein said synchronizing separating means supplies said servo means a signal corresponding to a vertical synchronizing signal within the video signal as said reference signal.

6. A magnetic disk recorder comprising:

a master disk upon which a video signal having a synchronizing component and audio signal are recorded, said master disk have a reference point provided thereon;

a master reference point detection means for detecting the periodic movement of said reference point and for generating a master reference signal based thereon;

a first motor for rotating said master disk;

a first phase servo circuit for controlling said first motor on the basis of said master reference signal;

a first magnetic head which detects said video signal and said audio signal as said master disk is rotated and producing an electric signal based thereon, said electric signal having an audio component corresponding to said audio signal and a video component corresponding to said video signal;

a synchronizing separator circuit operatively coupled to said first magnetic head for obtaining a synchronizing signal from said video component;

means operatively coupled to said first magnetic head for producing a control signal each time said synchronizing component of said video signal is detected from said video component;

a slave disk having a reference point thereon;

a second motor for rotating said slave disk;

a slave reference point detection means for detecting the periodic movement of said reference point on said slave disk and generating a slave reference signal based thereon;

a second phase servo control circuit for controlling said second motor on the basis of a signal supplied to a reference input;

a flag signal detector operatively coupled to said first magnetic head for detecting a start flag signal included in said audio component of said electric signal and producing a flag signal based thereon;

a first delay circuit directly coupled to said flag signal detector for adding a delay to said flag signal detector and providing a delayed flag signal;

a second delay circuit directly coupled to said synchronizing separator circuit for adding a delay to said synchronizing signal and providing a delayed synchronizing circuit;

switching means for selectively routing either said delayed flag signal or said delayed synchronizing signal to said reference input of said second phase servo circuit on the basis of said control signal from said means for producing a control signal, whereby said delayed flag signal is routed to said reference input when said synchronizing component is not detected by said means for producing a control signal and said delayed synchronizing signal is routed to said reference input when said video signal is detected by said means for producing a control signal;

a second magnetic head for recording onto said slave disk as said slave disk is rotated by said second motor; and means for supplying said electric signal to said second magnetic head whereby it is recorded onto said slave disk as it is rotated under control of said second phase servo circuit.

7. A magnetic disk recorder as set forth in claim 6, wherein said means for supplying includes:

a first circuit for obtaining a first signal from said electric signal having a luminance video component and an audio component;

a second circuit for obtaining a second signal from said electric signal having a chroma video component; and an adder having a first input for receiving said first signal, a second input for receiving said second signal, and a control input coupled to said means for producing a control signal, wherein said adder selectively adds said second signal to said first signal and outputs the added signal to said second magnetic head or outputs only said first signal to said second magnetic head depending on whether said synchronizing component is detected by said means for producing a control signal.

8. A magnetic disk recorder as set forth in claim 7, further comprising a monitor for displaying the said first signal and said second signal.

9. A magnetic disk recorder as set forth in claim 8, wherein said second signal is selectively processed through a timebase expander prior to being provided to said monitor according to the state of said control signal.

10. A magnetic disk recorder as set forth in claim 6, wherein said audio signal is timebase-compressed.

* * * * *